United States Patent
Weekes et al.

(10) Patent No.: US 6,424,266 B1
(45) Date of Patent: Jul. 23, 2002

(54) APPARATUS FOR PREVENTING THERMAL DAMAGE TO AN ELECTRICAL POWER TRANSFORMER

(75) Inventors: Mark Anthony Weekes; Robert George Coish; Zhiying Zhang; Glenn William Swift, all of Winnipeg (CA)

(73) Assignee: NxtPhase Technology SRL, St. James (BB)

( * ) Notice: Subject to any disclaimer, the term of this patent is extended or adjusted under 35 U.S.C. 154(b) by 0 days.

(21) Appl. No.: 09/617,761

(22) Filed: Jul. 17, 2000

(51) Int. Cl.[7] .............................................. G08B 17/00
(52) U.S. Cl. ....................... 340/588; 340/643; 340/646; 340/662; 700/292
(58) Field of Search ................................ 340/588, 646, 340/635, 643, 664, 662, 584, 310.07; 364/557; 700/292

(56) References Cited

U.S. PATENT DOCUMENTS

| | | | | |
|---|---|---|---|---|
| 3,797,314 A | * | 3/1974 | Lampe et al. .................. | 73/350 |
| 4,148,086 A | * | 4/1979 | Landa et al. ................... | 361/37 |
| 4,258,570 A | * | 3/1981 | Weiler .......................... | 73/350 |
| 4,573,132 A | * | 2/1986 | Boothman et al. ........... | 364/557 |
| 4,623,265 A | * | 11/1986 | Poyser ....................... | 374/152 |
| 4,654,806 A | * | 3/1987 | Poyser et al. ............... | 700/292 |
| 4,754,405 A | * | 6/1988 | Foster ........................ | 364/557 |
| 4,775,245 A | * | 10/1988 | Hagerman et al. .......... | 374/134 |
| 4,839,770 A | * | 6/1989 | Ruta ............................ | 361/93 |

OTHER PUBLICATIONS

Mathematical Function taken from—Guide of the Institute of Electrical and Electronics Engineers: C57.91–1995 "IEEE Guide for Loading Mineral Oil Immersed Transformers" (2 pages).

* cited by examiner

Primary Examiner—Jeffery Hofsass
Assistant Examiner—Phung T. Nguyen
(74) Attorney, Agent, or Firm—Adrian D. Battison; Michael R. Williams

(57) ABSTRACT

An apparatus for monitoring and controlling the operation of an electrical power transformer includes a processor with input transducers for providing to the processor inputs indicative of electrical current in a winding of the transformer and ambient temperature outside the transformer. The processor is arranged using an algorithm based upon heat transfer to repeatedly calculate a first prediction, based upon the present values of electrical current and ambient temperature, of a time period before the hot spot temperature exceeds a pre-set allowable maximum and a second prediction, based upon the current value of power, of a time period before the accumulated loss of life exceeds a pre-set allowable maximum. If the shorter time period of the two calculations is less than a pre-set value, for example one half hour, the processor generates an alarm signal and a display counting down the time remaining in the period, together with a second alarm signal at a shorter second time of for example one quarter hour.

20 Claims, 2 Drawing Sheets

APPARATUS FOR PREVENTING THERMAL DAMAGE TO AN ELECTRICAL POWER TRANSFORMER

This invention relates to an apparatus for preventing thermal damage to an electrical power transformer.

BACKGROUND OF THE INVENTION

Electrical power transformers have been used for many years and have been changed little in design over those years. They are normally cooled by circulating oil through the windings and the conductors are insulated from each other with cellulose, that is, paper. If the cellulose insulation gets too hot for too long a time, it can become structurally weak and allow the conductors to touch each other causing a catastrophic short-circuit.

"Current" in a power transformer is defined as the electrical current in one of the main windings.

"Hot Spot Temperature" in a transformer is defined as the temperature of the cellulose insulation within the transformer, at its hottest location. This temperature is usually a calculated value, since the location and parameters for a particular transformer design are not usually known accurately.

An alternative is a measured hot spot temperature: the maximum of several fiber-optic-sensed temperatures at carefully selected points within the transformer. This is an expensive and delicate method; hence the widespread use of the usual calculated method.

"Thermal Damage" in a power transformer is defined as structurally-weakened cellulose insulation within the transformer.

The structural damage is cumulative, that is, if the strength is reduced by a certain amount during an over-temperature condition, then the insulation does not recover its strength; and subsequent over-temperature conditions cause additional damage.

"Loss of Life" is the accumulated damage to insulation at the hottest spot location. It is defined by a mathematical function taken from a Guide of the Institute of Electrical and Electronics Engineers: C57.91-1995 "IEEE Guide for Loading Mineral Oil Immersed Transformers." It depends on two factors: the degree of excessive hot spot temperature and the time over which the condition persists.

"Total loss of life" of the insulation in a power transformer is defined as the condition for which the cellulose insulation has reached a proportion—such as one-half—of its original structural strength.

Up till now, thermal damage has been assumed to occur either when a current limit has been exceeded or when a hot spot temperature limit has been exceeded.

SUMMARY OF THE INVENTION

It is one object of the present invention therefore to provide an improved apparatus for preventing thermal damage to an electrical power transformer.

According to one aspect of the invention there is provided an apparatus for preventing thermal damage to an electrical transformer comprising:

a processor
an input current transducer,
an input ambient temperature transducer,
means for an operator to enter a setting of loss of life limit beyond which thermal damage would occur,
an output trip contact arranged to be activated when the setting is exceeded,
an output alarm contact arranged to be closed by the processor,
the processor being arranged to repeatedly calculate a time based on a prediction algorithm that uses as input the present value of current and the present value of ambient temperature and to close the output alarm contact when the prediction algorithm predicts a trip condition in a time less than a given value, such as thirty minutes.

Preferably the processor is arranged to begin the accumulated loss of life calculation only when the hot spot temperature exceeds its normal rated value.

Preferably the processor is arranged to reset its calculated accumulated loss of life to zero whenever the hot spot temperature falls below its normal rated value.

Preferably there is provided a second output alarm contact arranged to be closed when the prediction algorithm predicts a trip condition in a time less than a smaller value, such as fifteen minutes.

Preferably the set time period, for example one half hour, is selected so as to provide the operator with a sufficient period of time to take effective remedial action.

Preferably the calculation is carried out on the assumption that the present current and ambient temperature will remain unchanged during the set time period.

Preferably there is provided a time display and wherein the processor is arranged to indicate on the time display a remaining portion of time from the present time to the time at which the setting would be exceeded.

Preferably the processor is arranged to cancel the alarm condition in the event a calculated time period of any subsequent calculation is greater than the predetermined set time period.

Preferably there is also provided an output contact that closes at a set maximum value of hot spot temperature regardless of whether or not the accumulated loss of life limit has been reached.

Preferably the hot spot temperature trip is included in the prediction algorithm.

Preferably if either the accumulated loss of life setting is exceeded or the hot spot temperature setting is exceeded the prediction algorithm generates an alarm contact closure.

The invention as defined above therefore provides an electronic hardware-software combination that predicts when the insulation in an electrical power transformer will suffer undesirable thermal damage, up to say thirty minutes before such thermal damage would occur. An alarm output contact closes, and a "time-to-trip" countdown begins, from thirty minutes down to zero, at one minute intervals. If conditions change, that is remedial action is taken to alleviate the condition, then the prediction system continuously re-predicts.

BRIEF DESCRIPTION OF THE DRAWINGS

One embodiment of the invention will now be described in conjunction with the accompanying drawings, in which.

In the drawings like characters of reference indicate corresponding parts in the different figures.

DETAILED DESCRIPTION OF PREFERRED EMBODIMENTS

Figure 1:
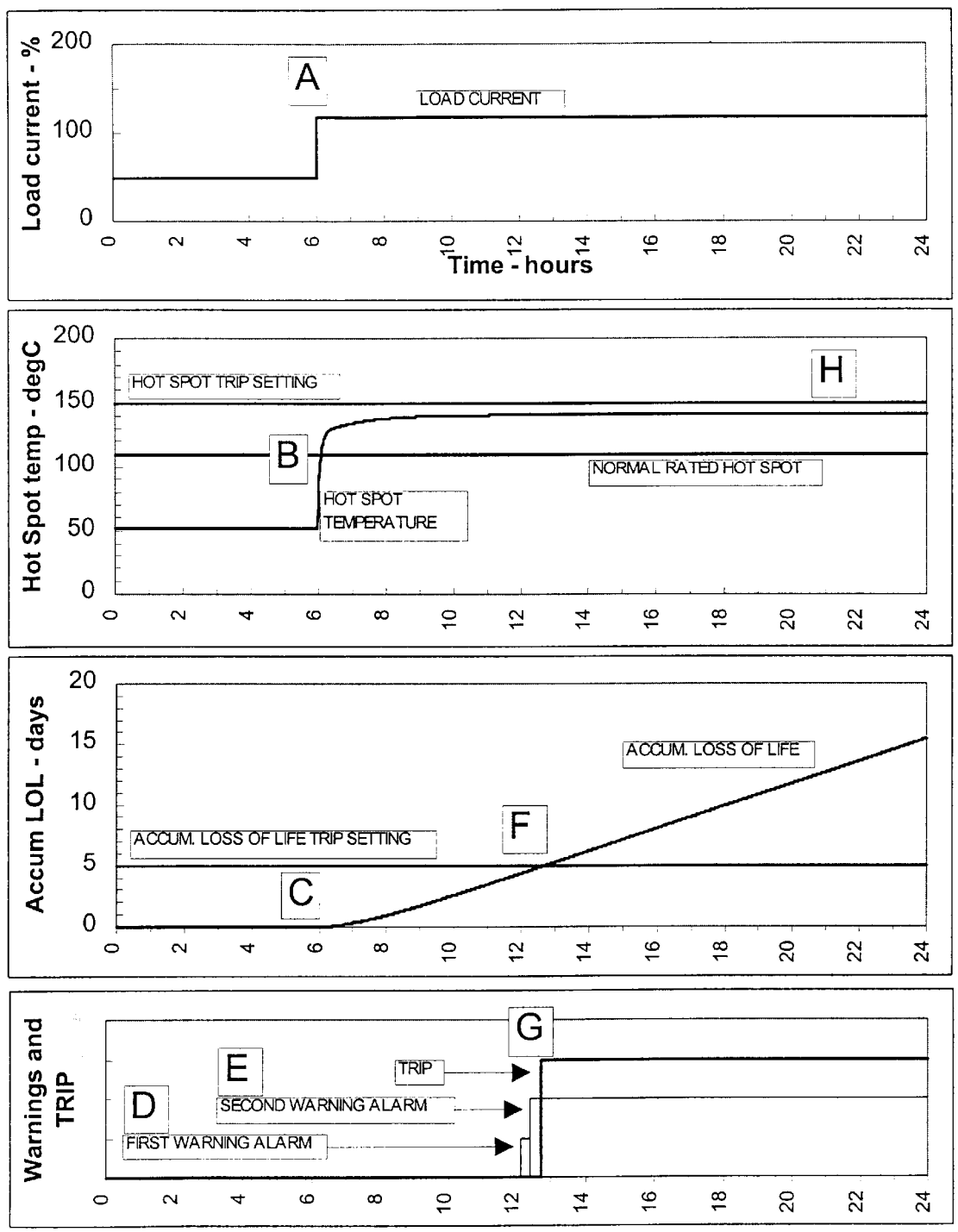
FIG. 1 is a set of four graphs of load current, hot spot temperature, accumulated loss of life, warnings and trip, versus time for an apparatus according to the present invention.
Figure 2:
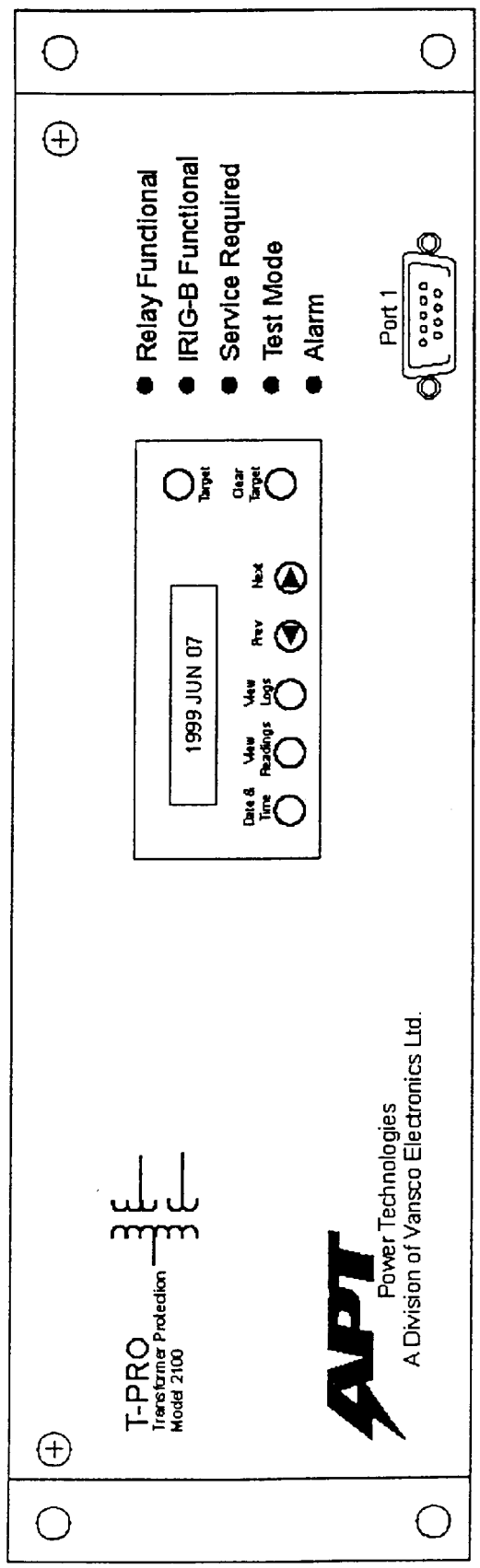
FIG. 2 is a front elevational view of the apparatus.

From a temperature sensor and a load current sensor, the device calculates the present hot spot temperature. The temperature sensor can be responsive to the ambient temperature or to a sensed temperature within the transformer itself.

If the hot spot temperature is below a loss of life pickup threshold value, the accumulated loss of life calculation is reset to zero.

The calculation proceeds as follows:
(1) Calculation of hot spot temperature
Variables (functions of time, t)
$\Theta_A$=ambient temperature, ° C.
$\Theta_{TO}$=top oil temperature, ° C.
$\Theta_H$=hot spot temperature, ° C.
$\Delta\Theta_H$=hot spot rise above top oil temperature, ° C.
$\Delta\Theta_{H,U}$=ultimate hot spot temperature rise over top oil (for a given load current), ° C.
$\Delta\Theta_{TO,U}$=ultimate top oil temperature rise over ambient (for a given load current), ° C.
K=load current, per unit Parameters (constants)
$\Delta\Theta_{TO,R}$=rated top oil temperature rise over ambient, ° C.
$\Delta\Theta_{H,R}$=rated hot spot temperature rise over top oil, ° C.
$\tau_{TO}$=top oil rise time constant, hours
$\tau_H$=hot spot rise time constant, hours
R=ratio of load loss at rated-load to no-load loss at applicable tap position, dimensionless
m=empirically derived exponent, dependent on the cooling method, dimensionless
n=empirically derived exponent, again dependent on the cooling method, dimensionless Equations At each time step, calculate the ultimate top oil rise from the load current at that instant, using $$\Delta\Theta_{TO,U} = \Delta\Theta_{TO,R}\left[\frac{K^2R+1}{R+1}\right]^n \quad (1)$$

From this, and the ambient temperature at each time step, solve the following differential equation for the top oil temperature $\Theta_{TO}$.

$$\tau_{TO}\frac{d\Theta_{TO}}{dt} = [\Delta\Theta_{TO,U} + \Theta_A] - \Theta_{TO} \quad (2)$$

Calculate the ultimate hot spot rise using $$\Delta\Theta_{H,U}=\Delta\Theta_{H,R}K^{2m} \quad (3)$$

From this, solve the following differential equation for the hot spot rise $\Delta\Theta_H$:

$$\tau_H\frac{d\Delta\Theta_H}{dt} = \Delta\Theta_{H,U} - \Delta\Theta_H \quad (4)$$

Finally, add the top oil temperature to the hot spot rise to get the hot spot temperature $\Theta_H$:

$$\Theta_H=\Theta_{TO}+\Delta\Theta_H \quad (5)$$

(2) Calculation of Loss of Life

The rate at which life of the transformer insulation is lost is given by $$\frac{dL}{dt} = e^{\left[\frac{15000}{383}\right]-\left[\frac{15000}{\Theta_H+273}\right]} \quad (6)$$

where L is the loss of life,
d/dt is the differential operator,
e is the base of natural logarithms,
$\Theta_H$ is the hot spot temperature.

At each time step, the equation is integrated to give the loss of life at that time.

The loss of life is the integral of the rate of loss of life:

$$L = \int_0^T \left[\frac{dL}{dt}\right]dt \quad (7)$$

where T is the period of integration.

On the assumption that the ambient temperature and load current are most likely to remain at their present values, into the future, the foregoing differential equations are used to predict the time at which either (1) hot spot temperature or (2) loss of life would exceed the settings levels defined and set by the user as excessive hot spot temperature or excessive loss of life, respectively. These settings are entered by means of a personal computer connected by cable through a serial port on the apparatus.

If both levels are below the settings at a time which is thirty minutes or less into the future, no action is taken.

A thirty minute warning alarm is generated if the time is thirty minutes or less and greater than fifteen minutes. This time is selected such that it gives an operator time to take remedial action to rectify the problem leading to this condition without necessity for shut downs which could cause blackout. The set time can be varied if required.

A fifteen minute warning alarm is generated if the time is equal to or less than fifteen minutes.

If the calculated time until trip is thirty minutes or less, a time-to-trip message is generated, indicating the minutes left until the excessive hot spot temperature or excessive loss of life condition is predicted to happen.

If remedial action is taken in response to an alarm, that is, the load current is reduced by system operators, then the calculation continuously re-calculates using the new load current as the assumed steady load current into the future.

The algorithm by which the hot spot temperature is calculated and the time period before that hot spot temperature exceeds the pre-set maximum value is as follows:

Equations (1) to (5) are solved implicitly, that is, values of the integration period T are found which satisfy $$\Theta_{Hsetting}=\Theta_H \quad (8)$$

The result is used in the manner described elsewhere, only if the value of T is between zero and thirty minutes.

The algorithm by which the loss of life is calculated and the time period before that loss of life exceeds the pre-set maximum value setting is as follows:

Equation (7) is solved implicitly, for T, given the setting for excessive loss of life limit L=$L_{setting}$:

$$L_{setting} = \int_0^T \left[\frac{dL}{dt}\right]dt \quad (9)$$

The result is used in the manner described elsewhere, only if the value of T is between zero and thirty minutes.

FIG. 1 shows the scenario for a sudden increase in power transfer through the transformer that is, a sudden increase in the load current at time 6 hours, labeled "A" in the figure.

At "B" in the figure, the resulting sudden rise in the hotspot temperature crosses the "NORMAL RATED HOT SPOT level, which starts the ACCUM. LOSS OF LIFE integration, at "C".

At "D," about 12:15 hours on the time scale, the FIRST WARNING ALARM is activated.

At "E," about 12:30 hours on the time scale, the SECOND WARNING ALARM is activated.

At "F," about 12:45 hours on the time scale, a TRIP is actuated: "G."

If the warnings are heeded, between "D" and "G" and the load current is reduced by the operators, then the TRIP may be avoided, that being the reason for the warnings.

Since various modifications can be made in our invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for preventing thermal damage to an electrical power transformer comprising:
   a processor
   a current input transducer for providing to the processor an input indicative of the transformer current;
   an ambient temperature input transducer for providing to the processor an input indicative of an ambient temperature outside the transformer;
   an operator input for entering a setting of loss of life beyond which thermal damage to the transformer would occur;
   an output trip contact arranged to be activated when the setting is exceeded;
   an output alarm contact arranged to be closed by the processor;
   the processor being arranged to repeatedly calculate a time based upon a prediction algorithm that uses the present value of current and ambient temperature and to close the output alarm contact when the prediction algorithm predicts a trip condition in a time less than a given value.

2. The apparatus according to claim 1 wherein the processor is arranged to begin the accumulated loss of life calculation only when the hot spot temperature exceeds its normal rated value.

3. The apparatus according to claim 1 wherein the processor is arranged to reset its calculated accumulated loss of life to zero whenever the hot spot temperature falls below its normal rated value.

4. The apparatus according to claim 1 wherein there is provided a second output alarm contact arranged to be closed when the prediction algorithm predicts a trip condition in a time less than a smaller value.

5. The apparatus according to claim 1 wherein the set time period is selected so as to provide the operator with a sufficient period of time to take effective remedial action.

6. The apparatus according to claim 1 wherein the calculation is carried out on the assumption that the present current and ambient temperature will remain unchanged during the set time period.

7. The apparatus according to claim 1 wherein there is provided a time display and wherein the processor is arranged to indicate on the time display a remaining portion of time from the present time to the time at which the setting would be exceeded.

8. The apparatus according to claim 1 wherein the processor is arranged to cancel the alarm condition in the event a calculated time period of any subsequent calculation is greater than the predetermined set time period.

9. The apparatus according to claim 1 wherein there is also provided an output contact that closes at a set maximum value of hot spot temperature regardless of whether or not the accumulated loss of life limit has been reached.

10. The apparatus according to claim 1 wherein the hot spot temperature trip is included in the prediction algorithm.

11. The apparatus according to claim 4 wherein the set time period is of the order of one half hour.

12. An apparatus for preventing thermal damage to an electrical power transformer comprising:
    a processor;
    a current input transducer for providing to the processor an input indicative of the transformer current;
    an ambient temperature input transducer for providing to the processor an input indicative of an ambient temperature outside the transformer;
    an operator input for entering a first setting of loss of life beyond which thermal damage to the transformer would occur and a second setting of an allowable maximum hot spot temperature;
    an output trip contact arranged to be activated when either the first or the second setting is exceeded;
    an output alarm contact arranged to be closed by the processor;
    the processor being arranged to repeatedly calculate a time based upon a prediction algorithm that uses the present value of current and ambient temperature and to close the output alarm contact when the prediction algorithm predicts a trip condition in a time less than a given value.

13. The apparatus according to claim 12 wherein the processor is arranged to begin the accumulated loss of life calculation only when the hot spot temperature exceeds its normal rated value.

14. The apparatus according to claim 12 wherein the processor is arranged to reset its calculated accumulated loss of life to zero whenever the hot spot temperature falls below its normal rated value.

15. The apparatus according to claim 12 wherein there is provided a second output alarm contact arranged to be closed when the prediction algorithm predicts a trip condition in a time less than a smaller value.

16. The apparatus according to claim 12 wherein the set time period is selected so as to provide the operator with a sufficient period of time to take effective remedial action.

17. The apparatus according to claim 12 wherein the calculation is carried out on the assumption that the present current and ambient temperature will remain unchanged during the set time period.

18. The apparatus according to claim 12 wherein there is provided a time display and wherein the processor is arranged to indicate on the time display a remaining portion of time from the present time to the time at which the setting would be exceeded.

19. The apparatus according to claim 1 wherein the processor is arranged to cancel the alarm condition in the event a calculated time period of any subsequent calculation is greater than the predetermined set time period.

20. A method for preventing thermal damage to an electrical power transformer comprising:
    providing a processor
    providing to the processor an input indicative of the transformer current;

providing to the processor an input indicative of an ambient temperature outside the transformer;

entering a setting of loss of life beyond which thermal damage to the transformer would occur;

providing an output trip contact arranged to be activated when the setting is exceeded;

providing an output alarm contact arranged to be closed by the processor;

and causing the processor to repeatedly calculate a time based upon a prediction algorithm that uses the present value of current and ambient temperature and to close the output alarm contact when the prediction algorithm predicts a trip condition in a time less than a given value.

* * * * *